US011368207B1

(12) United States Patent
Thatcher et al.

(10) Patent No.: US 11,368,207 B1
(45) Date of Patent: Jun. 21, 2022

(54) SYSTEM, METHOD AND APPARATUS FOR PROVIDING AN IMPROVED DATA PATH WITHIN A MECHANIZED IRRIGATION SYSTEM

(71) Applicant: Valmont Industries, Inc., Omaha, NE (US)

(72) Inventors: Tracy A. Thatcher, Gretna, NE (US); Mark Moeller, Valley, NE (US)

(73) Assignee: Valmont Industries, Inc., Omaha, NE (US)

(*) Notice: Subject to any disclaimer, the term of this patent is extended or adjusted under 35 U.S.C. 154(b) by 12 days.

(21) Appl. No.: 16/924,520

(22) Filed: Jul. 9, 2020

Related U.S. Application Data

(60) Provisional application No. 62/884,261, filed on Aug. 8, 2019.

(51) Int. Cl.
| *H04B 7/08* | (2006.01) |
| *H04L 67/12* | (2022.01) |
| *H01Q 1/52* | (2006.01) |
| *G05B 19/042* | (2006.01) |
| *H01Q 3/26* | (2006.01) |

(52) U.S. Cl.
CPC ........... *H04B 7/082* (2013.01); *G05B 19/042* (2013.01); *H01Q 1/526* (2013.01); *H01Q 3/26* (2013.01); *H04L 67/12* (2013.01); *G05B 2219/2625* (2013.01)

(58) Field of Classification Search
CPC .......... H04B 7/082; H01Q 1/526; H01Q 3/26; H04L 67/12; G05B 19/042; G05B 2219/2625
See application file for complete search history.

(56) References Cited

U.S. PATENT DOCUMENTS

| 6,671,582 | B1 | 12/2003 | Hanley |
| 6,975,245 | B1 | 12/2005 | Slater et al. |
| 8,442,722 | B2 | 5/2013 | Grabow et al. |
| 8,457,798 | B2 | 6/2013 | Hackett |
| 8,840,084 | B2 | 9/2014 | Crist et al. |
| 8,886,406 | B2 | 11/2014 | Grabow |
| 9,128,489 | B2 | 9/2015 | Bauman et al. |
| 9,244,449 | B2 | 1/2016 | Tennyson et al. |
| 11,029,437 | B2 * | 6/2021 | Imhof ...................... G01V 3/08 |
| 2003/0097482 | A1 | 5/2003 | DeHart et al. |
| 2010/0142445 | A1 | 6/2010 | Schlicht et al. |
| 2011/0111700 | A1 | 5/2011 | Hackett |
| 2014/0350793 | A1 | 11/2014 | Schräbler et al. |
| 2015/0195048 | A1 | 7/2015 | Burkey et al. |
| 2016/0309667 | A1 | 10/2016 | Kreikemeier |
| 2016/0349765 | A1 | 12/2016 | Woytowitz |

FOREIGN PATENT DOCUMENTS

WO 2001001752 A2 1/2001

* cited by examiner

*Primary Examiner* — Nader Bolourchi
(74) *Attorney, Agent, or Firm* — Milligan PC LLO

(57) ABSTRACT

The present invention provides an alternative communication path which uses a buried wired and a buried wire oscillator to transmit data between a centrally located pivot panel and an end tower control panel. According to a first preferred embodiment, a pivot panel of the present invention preferably includes a machine controller, a smart relay board, a modem, a guidance controller and a buried wire oscillator. According to a further preferred embodiment, a tower control panel of the present invention preferably includes a tower board controller, a modem, and a data antenna.

20 Claims, 4 Drawing Sheets

SYSTEM, METHOD AND APPARATUS FOR PROVIDING AN IMPROVED DATA PATH WITHIN A MECHANIZED IRRIGATION SYSTEM

RELATED APPLICATIONS

The present application claims priority to U.S. Provisional Application No. 62/884,261 filed Aug. 8, 2019.

FIELD AND BACKGROUND OF THE PRESENT INVENTION

Field of the Present Invention

The present invention relates generally to a system and method for controlling mechanized irrigation machines and, more particularly, to a system and method for providing an improved data path for an irrigation system.

Background of the Invention

Irrigation machines, especially corner machines and linear carts, are commonly guided by electrical wires which are buried in fields to be irrigated. These buried wires carry an electrical signal created by an oscillator operating at a particular frequency. The oscillator box is generally mounted at a central pivot control panel.

Typically, an outer drive tower, such as a steerable drive unit of a corner arm or the like, will include one reference antenna and two steering antennae (one for forward operation of the machine and one for reverse operation). Most commonly, these are mounted to a steering arm located below the center of the steerable drive unit base beam. In operation, the reference antenna "listens" for the signal from the buried wire. When the reference antenna "hears" a signal of the proper strength (as determined by the guidance receiver to which the antennae are attached), a relay is activated in a guidance control box to complete a safety circuit, allowing the irrigation machine to operate. The two steering antennae, in conjunction with the reference antenna, are used to detect the location of the steerable drive unit in relation to the wire. Specifically, the guidance box compares the signals of the steering and reference antennae to determine if steering is required to keep the steerable drive unit directly over the buried guidance wire. Under certain conditions, the signal received by the reference antenna will weaken below a threshold value. In this case, the safety relay in the guidance control box will open, breaking the safety circuit, and the machine will shut down.

Outside of the buried wire guidance system, control and data signals between elements of an irrigation machine are transmitted via control wires running the length of the irrigation machine. These wires may be dedicated communication wires or may be specifically modulated signals transmitted over a power circuit (e.g. power line carrier). Alternatively, the signals may be transmitted via RF signals such as with digital radios, Wi-Fi signals and the like. In practice, these systems are expensive to install and maintain. Further, they have significant reliability issues. For example, terrain and crops between the transmitter and receiver can prevent reception of wireless signals. Further, power line carriers may have severely limited data capacity (bandwidth) due to line noise. Further, separate, dedicated control wires are costly and susceptible to signal loss over the 1,250 ft. typical length of an irrigation machine.

What is needed is a reliable and inexpensive communications network to allow the elements of an irrigation system to effectively communicate.

SUMMARY OF THE PRESENT INVENTION

To address the shortcomings presented in the prior art, the present invention provides an alternative communication path which uses a buried wired and a buried wire oscillator to transmit data between a centrally located pivot panel and an end tower control panel. According to a first preferred embodiment, a pivot panel of the present invention preferably includes a machine controller, a smart relay board, a modem, a guidance controller and a buried wire oscillator. According to a further preferred embodiment, a tower control panel of the present invention preferably includes a tower board controller, a modem, and a data antenna.

According to a further preferred embodiment, the smart relay board of the present invention preferably transmits control signals from the pivot panel to the tower control panel by sending the control signals through the wire oscillator and adding the control signals to the oscillator signal sent down the buried wire.

According to a further preferred embodiment, the tower board panel of the present invention preferably transmits sensor signals from the tower control panel to the pivot panel using the buried wire. According to a further preferred embodiment, the sensor signal is transmitted to the buried wire by the data antenna.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
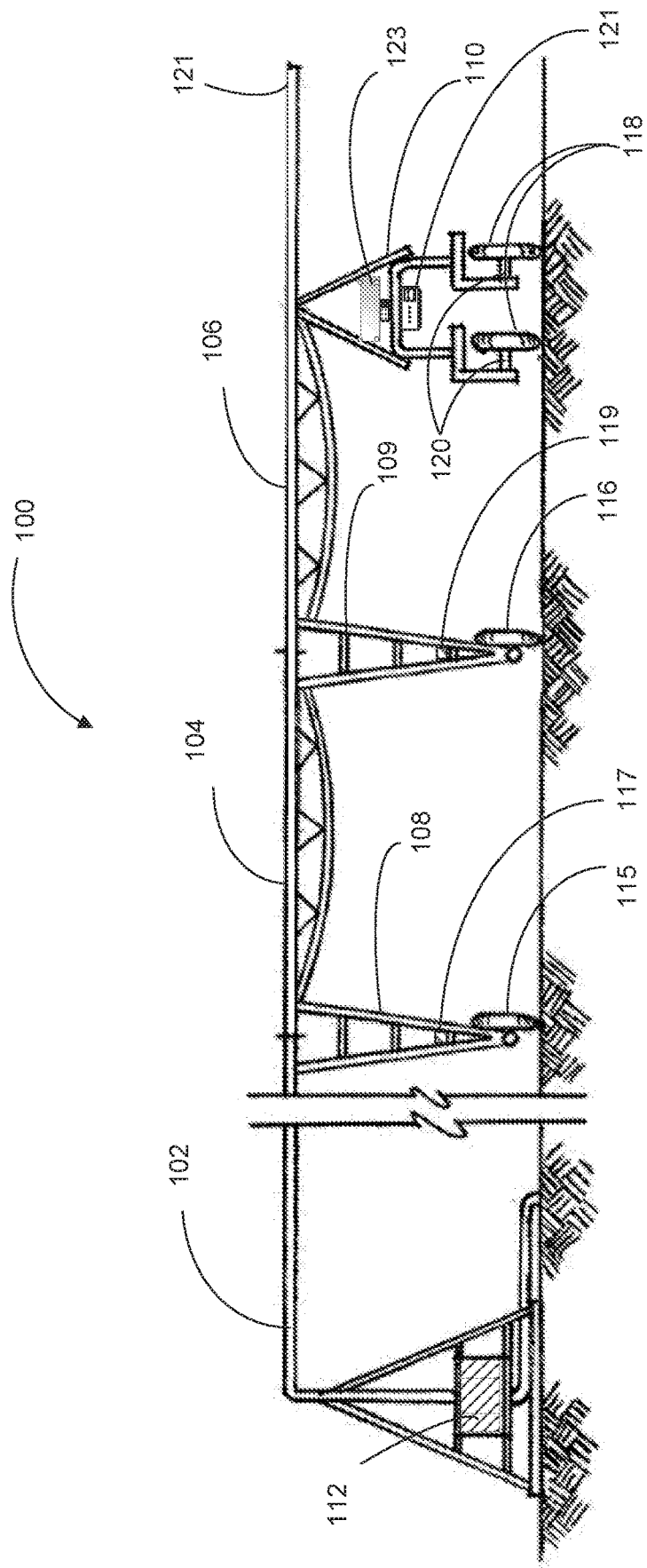
FIG. 1 shows a block diagram of an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory such as ROM, flash memory and other permanent storage media. Further, volatile storage such as RAM, buffers, cache memory, and network circuits are contemplated to serve as such data storage means according to different embodiments of the present invention.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switched reluctance, single phase AC and the like.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. According to alternative embodiments of the present invention, a single irrigation machine may use one or more drive towers in accordance with the present invention in combination with any of a variety of other types of drive towers (including unmotorized) without departing from the scope of the present invention.

As further shown in FIG. 1, the irrigation machine 100 may preferably further include an extension/overhang 121 which may include an end gun (not shown). In an implementation, the end gun is a suitable pressure sprayer configured to be activated at the corners of a field or other designated area to increase the amount of land that can be irrigated. As further shown in FIG. 1, the exemplary system 100 of the present invention may preferably further include a buried wired guidance system. More specifically, the exemplary system 100 of the present invention may preferably include an antenna array 123 which preferably detects the relative position of the last regular drive unit 110 (or other selected drive tower) to a buried wire (not shown). According to a further preferred embodiment, the signals and relative positions detected by the antenna array 123 are preferably forwarded to a guidance receiver 121 mounted on the steerable or master drive unit 110 for processing and evaluation.

Figure 2:
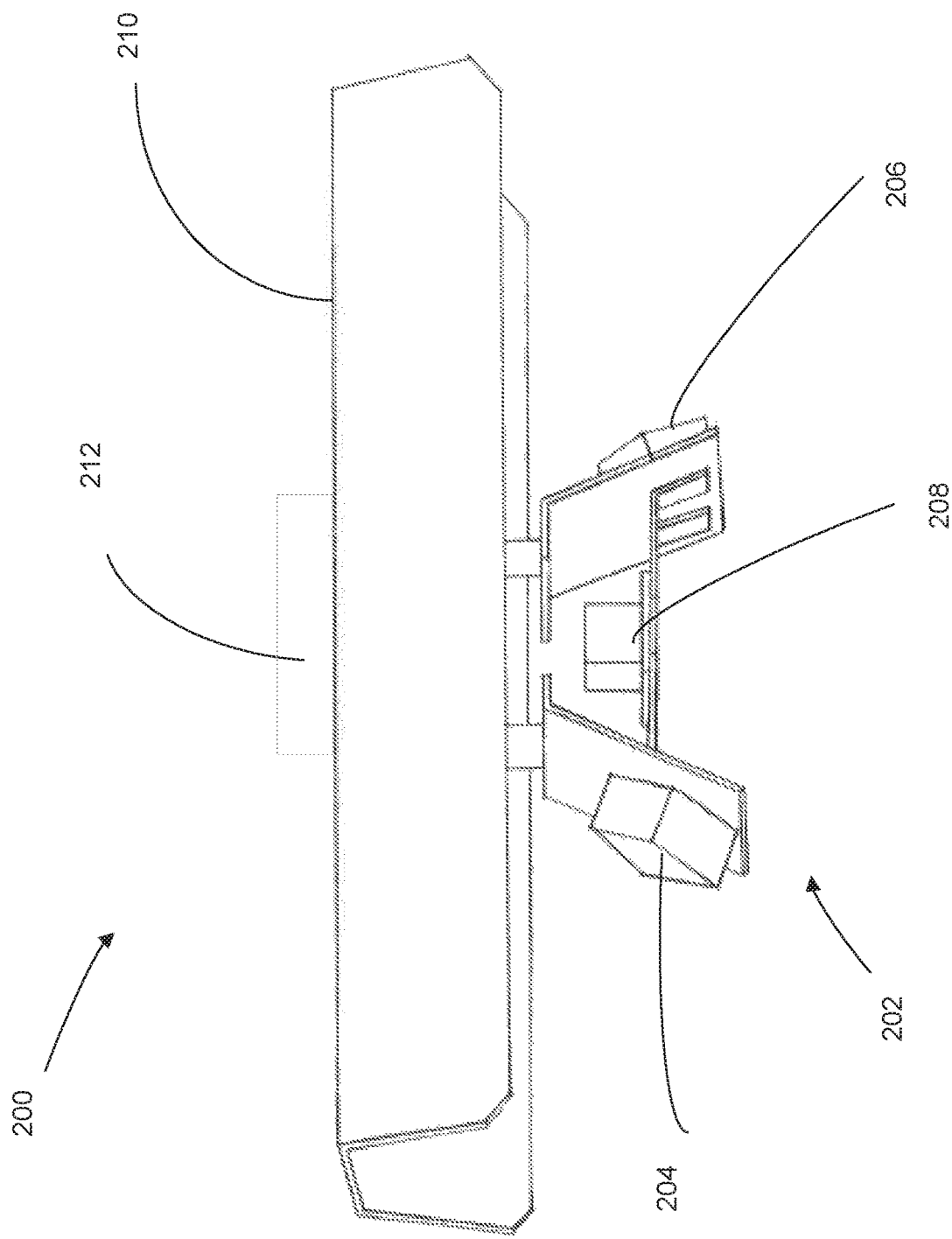
FIG. 2 shown an exemplary antenna design in accordance with an example embodiment of the present invention.

With reference now to FIG. 2, an exemplary antenna assembly 200 in accordance with a preferred embodiment of the present invention will now be further discussed. As shown in FIG. 2, the exemplary antenna assembly 200 of the present invention is preferably attached to a drive tower at a connection point 212. As further shown, the exemplary antenna assembly 200 preferably further includes an antenna shield 210 and antenna array 202. As further shown, the exemplary antenna array 202 of the present invention may preferably include a pair of steering antennas 204, 206 and a reference antenna 208. Preferably, the steering antennas 204, 206 and the reference antenna 208 receive signals from the buried guidance wire and send electrical signals to the guidance controller 304 in the control panel 300 as discussed further below.

Figure 3:
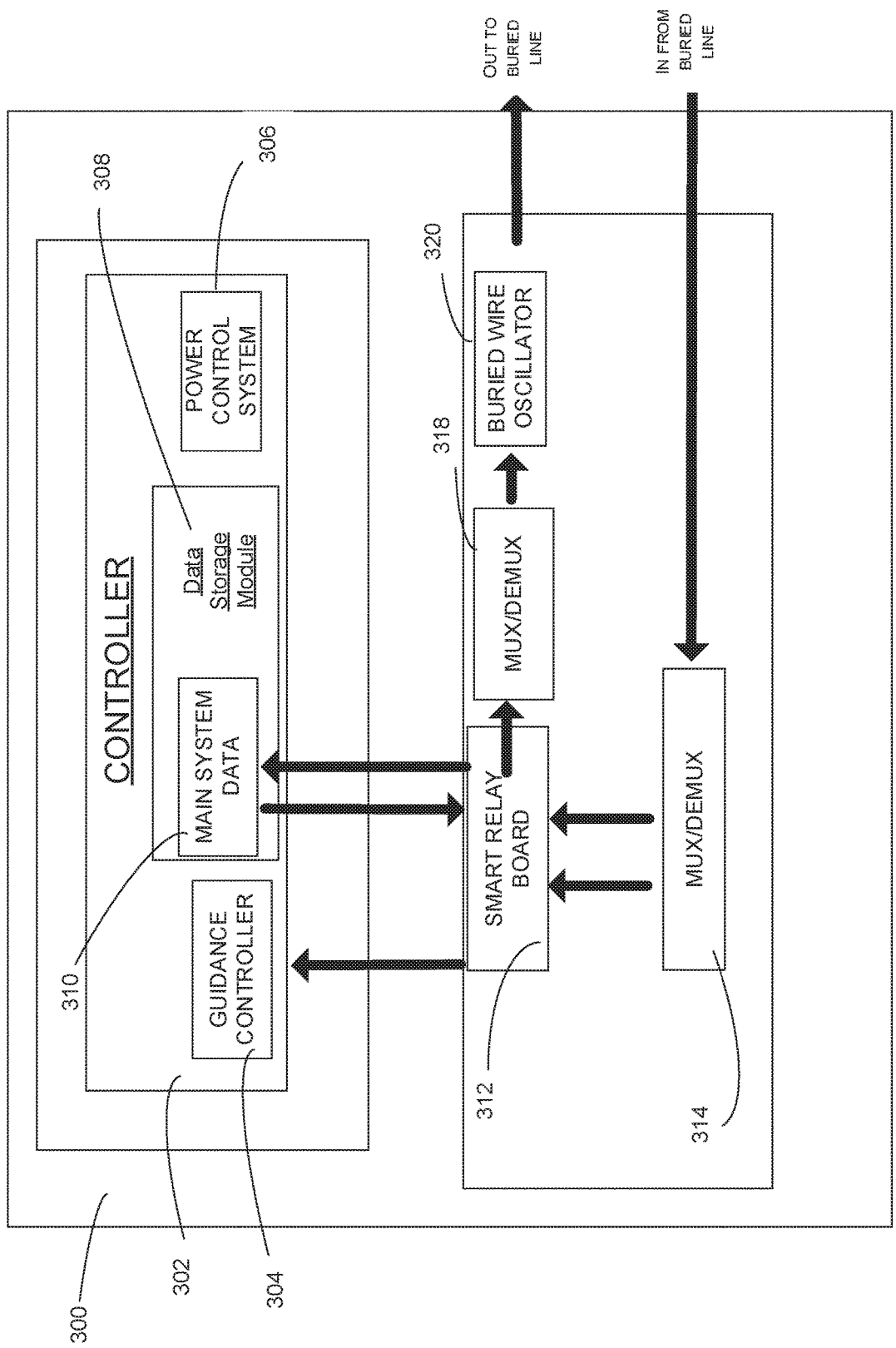
FIG. 3 illustrates a block diagram of an exemplary control panel for use with the present invention.

With reference now to FIGS. 1 and 3, an exemplary control device 300 which represents functionality to control one or more operational aspects of the irrigation system 100 will now be discussed. According to a preferred embodiment, the exemplary control device 300 preferably may reside within a guidance assembly enclosure 121, the pivot control panel 112 or other centralized, powered location. Further, the components and modules of the control device 300 may be distributed among multiple, different enclosures. As further shown, the exemplary control device 300 may preferably further include a processor/controller 302 having a storage/memory module 308. The processor/controller 302 preferably provides processing functionality for the control device 300 and may include any number of processors, micro-controllers, or other processing systems and may transmit, process and/or receive system data 310 to monitor and control system elements as discussed further below. The processor/controller 302 may further execute one or more software programs that implement techniques described herein. The storage/memory module 308 preferably provides storage functionality to store various data associated with the operation of the control device 300, such as the software program and code segments mentioned above, or other data to instruct the processor/controller 302 and other elements of the control device 300 to perform the steps described herein.

In implementations, the exemplary control device 300 preferably further includes a power control system 306 which may include conductive transmission lines, circuits and the like for controlling and routing electric power, controlling its quality, and controlling the devices attached to a power-line carrier system as discussed further below. Further, the control device 300 may include a guidance control module 304 which preferably receives guidance signals from one or more tower controllers as discussed further below. Preferably, the guidance signals are monitored by the guidance controller 304 which interfaces with the controller 302 and the power control system 306 to keep the end drive tower/corner over the guidance wire and to shut the machine down when the end drive tower/corner moves outside of guidance safety limits.

As further shown in FIG. 3, the control device 300 may preferably further include a smart relay board 312, a signal modulator/demodulator 318, buried wire oscillator 320, and a signal modulator/demodulator 314. According to preferred embodiments of the present invention, the smart relay board 312 preferably receives control signals from the controller 302 and then modulates the signals via modulator/demodulator 318. The control signals are then preferably sent to the wire oscillator 320 and added to the oscillator signal sent down the buried wire. According to preferred embodiments, modulators/demodulators 314 and 318 may be the same component.

For incoming signals, the control device 300 preferably receives control and data signals from the buried wire which are first demodulated 314 and then processed by the smart relay board 312. Within the smart relay board 312, guidance control signals from the buried wire oscillator 320 are preferably isolated and then directed to the guidance control module 304. At the same time, all other data signals are preferably separately provided to the controller 302 as system data 310 for further processing. As discussed above, the data and guidance signals may alternatively be filtered and separated by the modulator/demodulator 314.

Figure 4:
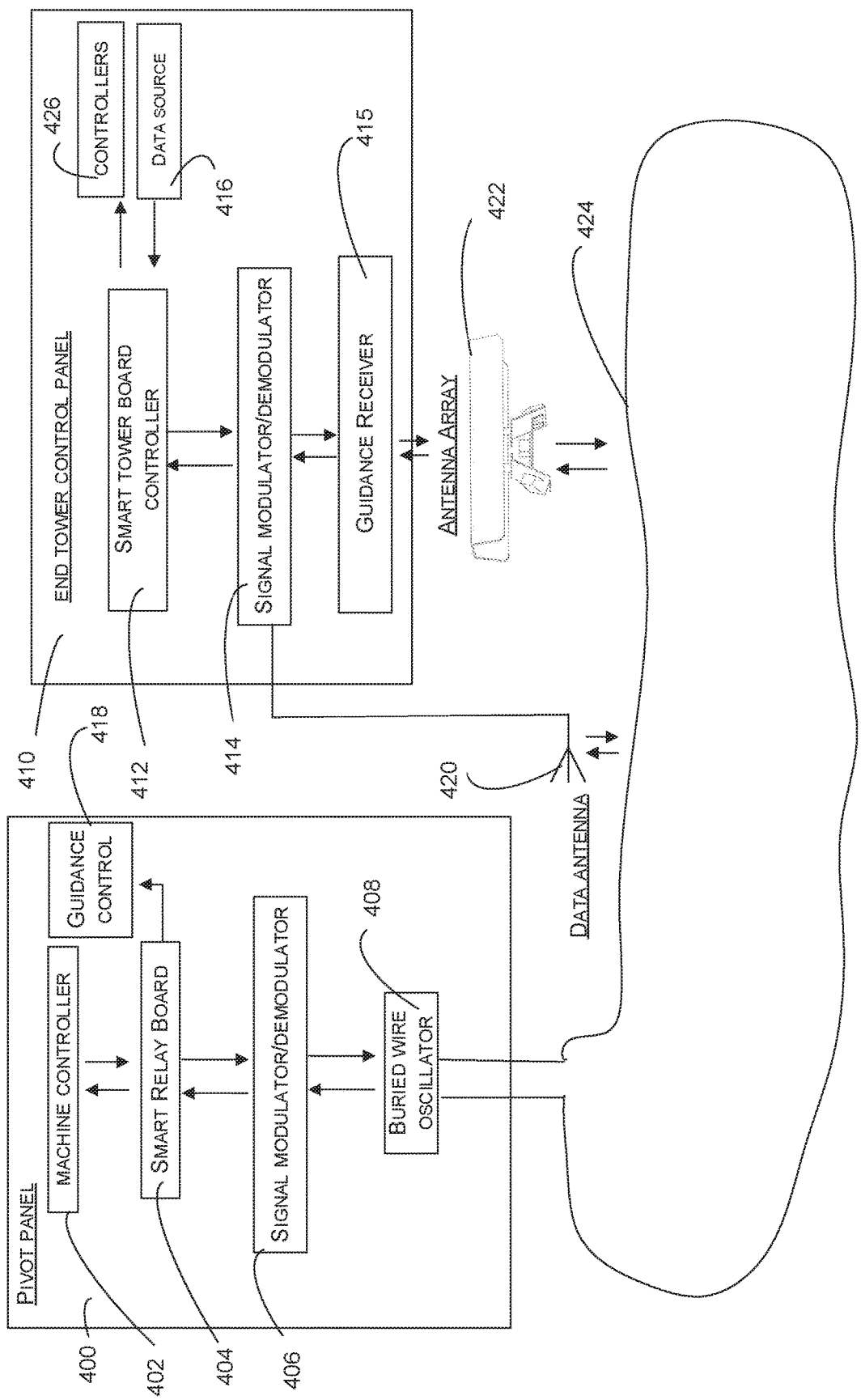
FIG. 4 shows an exemplary block diagram illustrating an example embodiment of the present invention.

With reference now to FIG. 4, an exemplary block diagram illustrating an example embodiment of the present invention shall now be further discussed. As shown, the present invention utilizes a buried wire infrastructure that enables an alternative path for transmitting data between a central pivot panel 400 and an end tower control panel 410 (e.g. an LRDU, corner arm drive tower). According to further preferred embodiments, data is preferably transmitted over a buried guidance wire 424 using modulated signals which are combined with oscillator generated signals transmitted on the buried wire 424 as described above. According to preferred embodiments, any of a number of modulation techniques may be used with the present invention including both digital and analog techniques. According to further preferred embodiments, such digital modulation techniques may include: phase-shift keying; frequency-shift keying; amplitude-shift keying; and quadrature amplitude modulation. According to further preferred embodiments, analog modulation techniques may include: amplitude modulation; double-sideband modulation; single-sideband modulation; vestigial sideband modulation; quadrature amplitude modulation; angle modulation; frequency modulation; phase modulation; and transpositional modulation.

According to preferred embodiments, data transmitted between the central pivot panel 400 and the end tower control panel 410 may include data such as: machine speed, percent timer, direction, error codes, GPS reference station correction data, machine status, tire pressure alarms, end-of-machine water pressure, and other data types. The oscillator of the present invention may further continuously transmit a unique identification signal (such as a modulated carrier tone or the like) over the buried wire 424 to allow the guidance receiver 415 to identify the buried wire 424 and confirm that the antenna array 422 is following the correct buried wire 424. Accordingly, the unique identification signal may preferably distinguish the buried wire 424 from other buried wires, power lines (buried and overhead), buried pipelines, tracer wires and adjacent buried wires for other irrigation systems.

As shown in FIG. 4, the present invention may preferably include modules and sub-components which may be distributed between a main pivot panel 400 and an end tower control panel 408 in a variety of combinations without limitation. As shown, the pivot panel 400 may include a machine controller 402, a smart relay board 404, a signal modulator/demodulator 406, and a buried wire oscillator 408. As further shown, an exemplary end tower control panel 410 may preferably include: a tower board controller 412, a modulator/demodulator 414; and a data antenna 420.

For transmitting signals, control signals from the pivot panel 400 may preferably be generated by the machine controller 402 and provided to the smart relay board 404. From the relay board 404, the control signals may preferably be first modulated via the modulator 406. Thereafter, they may be added to the signals from the buried wire oscillator 408 and sent along the buried wire 424.

The end tower control panel 410 may receive the transmitted control signals through either the data antenna 420 or through the antenna array 422. According to preferred embodiments, the data antenna 420 may preferably be formed as an antenna array which is dedicated to transmitting and receiving signals. In either case, the control signals are preferably demodulated via a demodulator 414 and provided to the smart tower board controller 412 which preferably separates the control data from the received signals and forwards the control data to the appropriate device/controller 426 for processing. According to a preferred embodiment, the tower controller may receive data from both the dedicated antenna/antenna array 420 as well as from the guidance receiver antenna array 422. The tower controller may further compare data from both sources to test for signal integrity/quality provided by one or both transmission paths. Independently, or based on this comparison, the tower board controller may select a single or primary transmission path to use.

In the case of a GPS correction signal, for example, the data would be forwarded to the guidance computer for correction of the GPS signal received from the GPS rover antenna. According to an alternative preferred embodiment, the demodulator 414 may alternatively be paired with a filter which separates the control signal/data from the received signal prior to the board controller 412.

For data transmission from the end tower 410 to the pivot panel 400, a reverse process is preferably used. Accordingly, a data source 416 near the end tower panel 410 (i.e. a transducer measuring end of machine water pressure), preferably provides data to the tower board controller 412. The tower board controller 412 then preferably formats and modulates (via modulator 414) a data signal for transmission. As shown, the data signal is preferably transmitted to the buried wire 424 via a data antenna/array 420 which is preferably located and tuned to transmit signals onto the buried wire 424. Once modulated onto the buried wire 424, the data signal may preferably be received by the pivot panel 400 where the signals are demodulated (via demodulator 406) and provided to the smart relay board 404. Thereafter, the smart relay board 404 preferably separates the guidance control signal from the data signals. Alternatively, the separation of the signals may be performed with filters within the demodulator 406.

Once the signals are separated, the guidance control signals are preferably routed to the guidance control module 418 for processing as discussed above. Simultaneously, the data signals may then preferably be forwarded to appropriate devices for processing. For example, an end machine pressure signal/reading would preferably be forwarded to an appropriate controller to generate a speed signal for a VFD pump station connected to the irrigation machine.

Referring once again to FIGS. 1-4 above, the present invention provides a system for transmitting signals between elements of an irrigation system. According to a second preferred embodiment, the system preferably includes a pivot panel 400, having a pivot panel controller 402, a smart relay board 404, a pivot panel modem 406, and a buried wire oscillator 408. In operation, the pivot panel controller 402 generates and transmits control instructions to the smart relay board 404 which transmits the control instructions to the buried wire oscillator 408 as a control instruction signal. The buried wire oscillator 408 is configured to transmit the control instruction signal and an oscillator signal onto the buried wire 424. Separate from the pivot panel 400, the system of the second preferred embodiment preferably includes a tower control panel 410 having a tower board controller 412, a tower modem 414, and a guidance receiver 415 which communicates with an antenna array 422.

As discussed above, the antenna array 422 preferably includes guidance antennas 204, 206 and a reference antenna 208. The reference antenna 208 is preferably positioned between the two steering antennas 204, 206. The antenna array 422 preferably receives and directs the control instruction signal and the oscillator signal to the guidance receiver 415. Thereafter, the guidance receiver 415 preferably directs the control instruction signal to the tower board controller 412 which executes the control instructions embedded in the control instruction signal. The guidance receiver 415 of the third preferred embodiment preferably may extract oscillator signal data from the oscillator signal and transmit the oscillator signal data to a controller 418/426 which analyzes the oscillator signal data and transmits a movement control signal to the tower control panel 410 to keep the antenna array 422 positioned over the buried guidance wire.

Referring again to FIGS. 1-4, a third preferred embodiment shall now be discussed. Preferably, a third preferred embodiment may include a system for transmitting signals between elements of a center pivot irrigation system which includes drive towers and a buried wire 424. The system of the third preferred embodiment preferably includes a pivot panel 400 having a pivot panel controller 402, a smart relay board 404, a pivot panel modem 406, a guidance controller 418 and a buried wire oscillator 408. In operation, the pivot panel controller 402 preferably generates and transmits control instructions to the smart relay board 404, which in turn transmits the control instructions to a buried wire oscillator 408 as a control instruction signal. Thereafter, the buried wire oscillator 408 preferably transmits the control instruction signal and an oscillator signal onto the buried wire 424.

The system of the third preferred embodiment preferably further includes a tower control panel 410 having a tower board controller 412, a tower modem 414, and a guidance receiver 415. The tower control panel preferably receives signals to and from an antenna array 422 (including two steering antennas 204, 206 and a reference antenna 208 as discussed above). According to the third preferred embodiment, the reference antenna 208 preferably receives and directs control instruction signals and the oscillator signal to the guidance receiver 415. The guidance receiver 415 preferably then directs the control instruction signal to the tower board controller 412 to execute the control instructions indicated by the control instruction signal. The guidance receiver 415 of the third preferred embodiment preferably extracts oscillator signal data from the oscillator signal and transmits the oscillator signal data to the tower board controller 412. Thereafter, the tower board controller 412 preferably analyzes the oscillator signal data to determine the relative position of the antenna array 422 to the buried wire 424. With this information, the tower board controller 412 preferably determines and transmits drive instructions to a tower drive unit 110 based at least in part on the oscillator signal data.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. A system for transmitting signals between elements of an irrigation system which includes a center pivot, a plurality of drive towers and a buried wire, wherein the system comprises:
   a pivot panel, wherein the pivot panel comprises: a pivot panel controller, a relay board, a pivot panel modem, and a buried wire oscillator;
   wherein the pivot panel controller is configured to generate and transmit control instructions to the relay board; wherein the relay board is configured to transmit the control instructions to the buried wire oscillator as a control instruction signal; wherein the buried wire oscillator is configured to transmit the control instruction signal and an oscillator signal onto the buried wire;
   a tower control panel, wherein the tower control panel comprises a tower board controller, a tower modem, and a guidance receiver; and
   an antenna array, wherein the antenna array comprises two steering antennas and a reference antenna; wherein the reference antenna is positioned between the two steering antennas; wherein the antenna array is configured to receive and direct the control instruction signal and the oscillator signal to the guidance receiver;
   wherein the guidance receiver is configured to direct the control instruction signal to the tower board controller; wherein the tower board controller is configured to execute the control instructions embedded in the control instruction signal;
   wherein the guidance receiver is further configured to extract oscillator signal data from the oscillator signal and to transmit the oscillator signal data to a guidance controller; wherein the guidance controller is configured to analyze the oscillator signal data to determine the relative position between the buried guidance wire and the reference antenna; wherein the guidance controller is configured to transmit a movement control signal to the tower control panel to keep the antenna array positioned over the buried guidance wire; wherein the movement control signal is based at least in part on the analysis of the oscillator signal data; wherein the oscillator signal data comprises data indicating the relative position between the buried guidance wire and the reference antenna.

2. The system of claim 1, wherein the system further comprises a data antenna; wherein the tower board controller is configured to receive transmitted signals from the data antenna and the antenna array.

3. The system of claim 2, wherein the tower board controller is configured to select whether the control instruction signal is received by the data antenna or the antenna array.

4. The system of claim 3, wherein the tower board controller is configured to compare transmitted signals received separately by the data antenna and the antenna array to determine a transmission quality of each transmission path.

5. The system of claim 4, wherein tower board controller is configured to select whether to receive the control instruction signal using the data antenna or the antenna array based on the detected transmission quality of each transmission path.

6. The system of claim 5, wherein the tower control panel is configured to transmit data.

7. The system of claim 6, wherein tower board controller is configured to select whether to transmit data using the data antenna or the antenna array based on the detected transmission quality of each transmission path.

8. The system of claim 7, wherein the tower control panel is configured to transmit a sensor signal from the tower control panel to the pivot panel using the buried wire; wherein the sensor signal is comprised of sensor data.

9. The system of claim 8, wherein the sensor signal is transmitted using the data antenna.

10. The system of claim 9, wherein the antenna array further comprises an antenna shield.

11. A system for transmitting signals between elements of an irrigation system which includes a center pivot, a plurality of drive towers and a buried wire, wherein the system comprises:

a pivot panel, wherein the pivot panel comprises: a pivot panel controller, a relay board, a pivot panel modem, a guidance controller and a buried wire oscillator;

wherein the pivot panel controller is configured to generate and transmit control instructions to the relay board; wherein the relay board is configured to transmit the control instructions to the buried wire oscillator as a control instruction signal; wherein the buried wire oscillator is configured to transmit the control instruction signal and an oscillator signal onto the buried wire;

a tower control panel, wherein the tower control panel comprises a tower board controller, a tower modem, and a guidance receiver; and an antenna array, wherein the antenna array comprises two steering antennas and a reference antenna; wherein the reference antenna is positioned between the two steering antennas; wherein the steering antennas and the reference antenna are configured to receive and direct the control instruction signal and the oscillator signal to the guidance receiver;

wherein the guidance receiver is configured to direct the control instruction signal to the tower board controller; wherein the tower board controller is configured to execute the control instructions indicated by the control instruction signal;

wherein the guidance receiver is configured to extract oscillator signal data from the oscillator signal and to transmit the oscillator signal data to the tower board controller; wherein the tower board controller is configured to transmit drive instructions to one of the plurality of drive towers based at least in part on the oscillator signal data.

12. The system of claim 11, wherein the system further comprises a data antenna; wherein the tower board controller is configured to receive data from the data antenna and the antenna array.

13. The system of claim 12, wherein the tower board controller is configured to select whether the control instruction signal is received by the data antenna or the antenna array.

14. The system of claim 13, wherein the tower board controller is configured to compare transmitted signals received separately by the data antenna and the antenna array to determine a transmission quality of each transmission path.

15. The system of claim 14, wherein tower board controller is configured to select whether to receive the control instruction signal using the data antenna or the antenna array based on the detected transmission quality of each transmission path.

16. The system of claim 15, wherein the tower control panel is configured to transmit data.

17. The system of claim 16, wherein tower board controller is configured to select whether to transmit data using the data antenna or the antenna array based on the detected transmission quality of each transmission path.

18. The system of claim 17, wherein the tower control panel is configured to transmit a sensor signal from the tower control panel to the pivot panel using the buried wire; wherein the sensor signal is comprised of sensor data.

19. The system of claim 18, wherein the sensor signal is transmitted using the data antenna.

20. The system of claim 19, wherein the antenna array further comprises an antenna shield.

* * * * *